United States Patent [19]
Wun et al.

[11] Patent Number: 5,537,240
[45] Date of Patent: Jul. 16, 1996

[54] BRILLIANCE CONTROL APPARATUS OF LIGHT SOURCE IN AN OPTICAL SCANNER

[75] Inventors: Jeffrey Wun, Hsinchu; Yao-Wen Chang, Miao-Li, both of Taiwan

[73] Assignee: UMAX Data Systems Inc., Hsinchu, Taiwan

[21] Appl. No.: 254,946

[22] Filed: Jun. 7, 1994

[51] Int. Cl.$^6$ ............................ G02B 26/02; F21V 17/14
[52] U.S. Cl. ..................... 359/227; 359/196; 359/885; 355/67; 355/71; 362/223; 362/260; 362/347; 362/351
[58] Field of Search .................... 359/196, 227, 359/885, 892; 355/67, 69, 71, 228, 229, 233; 358/475, 483, 487, 494, 497, 506, 509, 510, 461; 362/84, 217, 223, 224, 260, 296, 341, 347, 351

[56] References Cited

U.S. PATENT DOCUMENTS

| | | | |
|---|---|---|---|
| 4,113,379 | 9/1978 | Harada et al. | 355/71 |
| 5,205,632 | 4/1993 | Crinion | 367/260 |
| 5,355,198 | 10/1994 | Saito | 355/71 |

Primary Examiner—James Phan
Attorney, Agent, or Firm—W. Wayne Liauh

[57] ABSTRACT

A brilliance control apparatus of light source in an optical scanner particularly contemplating for a transparency scanner includes a generally rectangular lamp stand and a lamp shade which has an asymmetrical curvature surface and has a black reflector with a curved surface disposed therein. And is capable of performing filtering and darkening processes at the same time.

3 Claims, 3 Drawing Sheets

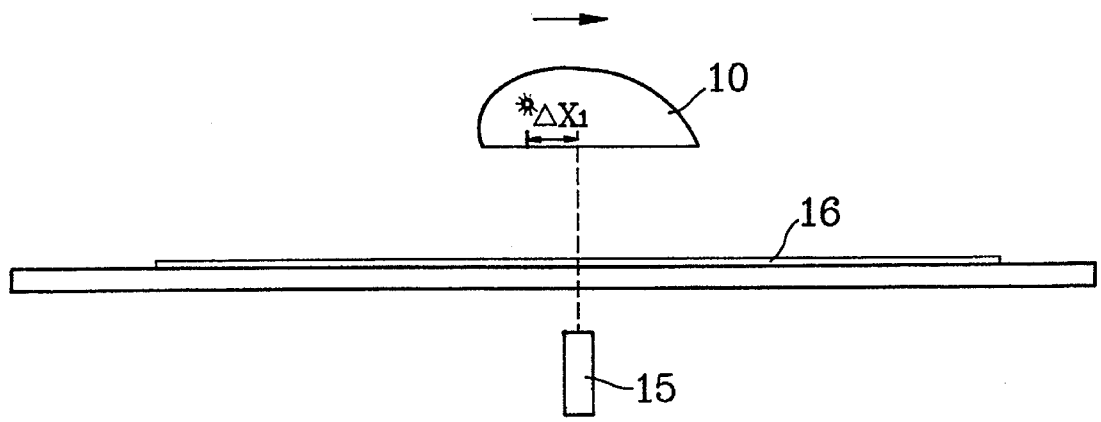
F I G.4
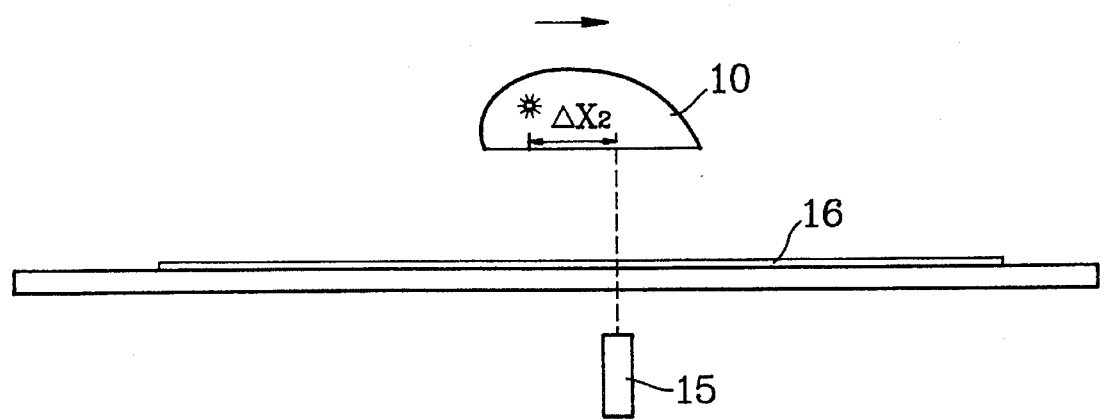
F I G.5

BRILLIANCE CONTROL APPARATUS OF LIGHT SOURCE IN AN OPTICAL SCANNER

BACKGROUND OF THE INVENTION

This invention relates to an optical scanner and the like. In a conventional optical scanner, brilliance control of a light source is usually done by darkening and filtering processes performed in the lamp tube and charged coupled device (CCD). The purpose of the darkening process is to maintain an evenly distributed brightness in axial direction of a scanning lamp tube, i.e. to make the scanning document with equal illuminance at every spot in the horizontal direction. The purpose of the filtering process is to adjust the light intensity of the light source according to the contrast difference of the scanning document to achieve a better scanning quality.

It is well-known that the light intensity of a fluorescent lamp is lower at the lateral sides. The conventional darkening process is to provide make-up light at the two lateral sides of a fluorescent lamp. It needs a specially designed reflector to obtain the desired results. When the object being scanned is a transparency, because the picture and image on a transparency usually have a wide variety of quality or contrast difference, the light intensity or the brilliance of the light source needs constant adjustment so as to obtain a better scanning result. The conventional approach is to equip a manual switch on the scanner to adjust the brightness of the light source. This increases the costs. The scanning quality and results are not always satisfactory since a manual switch has only a limited number of adjustment selections due to its physical or mechanical constraints. Thus there is a need for improvement on the control of brilliance of light source in an optical scanner.

SUMMARY OF THE INVENTION

It is accordingly an object of the present invention to provide a brilliance control apparatus of the light source in an optical scanner.

The present invention has been developed to provide a lamp stand which can meet both darkening and filtering requirements.

More specifically, the present invention comprises a lamp stand with a lamp shade having an asymmetrical curvature and having a lamp tube placed away from the central location of the lamp shade, thus the brightness in transversal direction can vary at different positions and has the filtering effect.

The present invention further comprises a black reflector with a curved surface in a lamp shade to partially perform darkening functions and to obtain evenly distributed brilliance in axial direction of the light source.

BRIEF DESCRIPTION OF THE DRAWINGS

FIG. 4 is a schematic side view which illustrates an operative position of the present invention.

FIG. 5 is a schematic side view illustrating another operative position of the present invention.

DESCRIPTION OF THE PREFERRED EMBODIMENT

Figure 1:
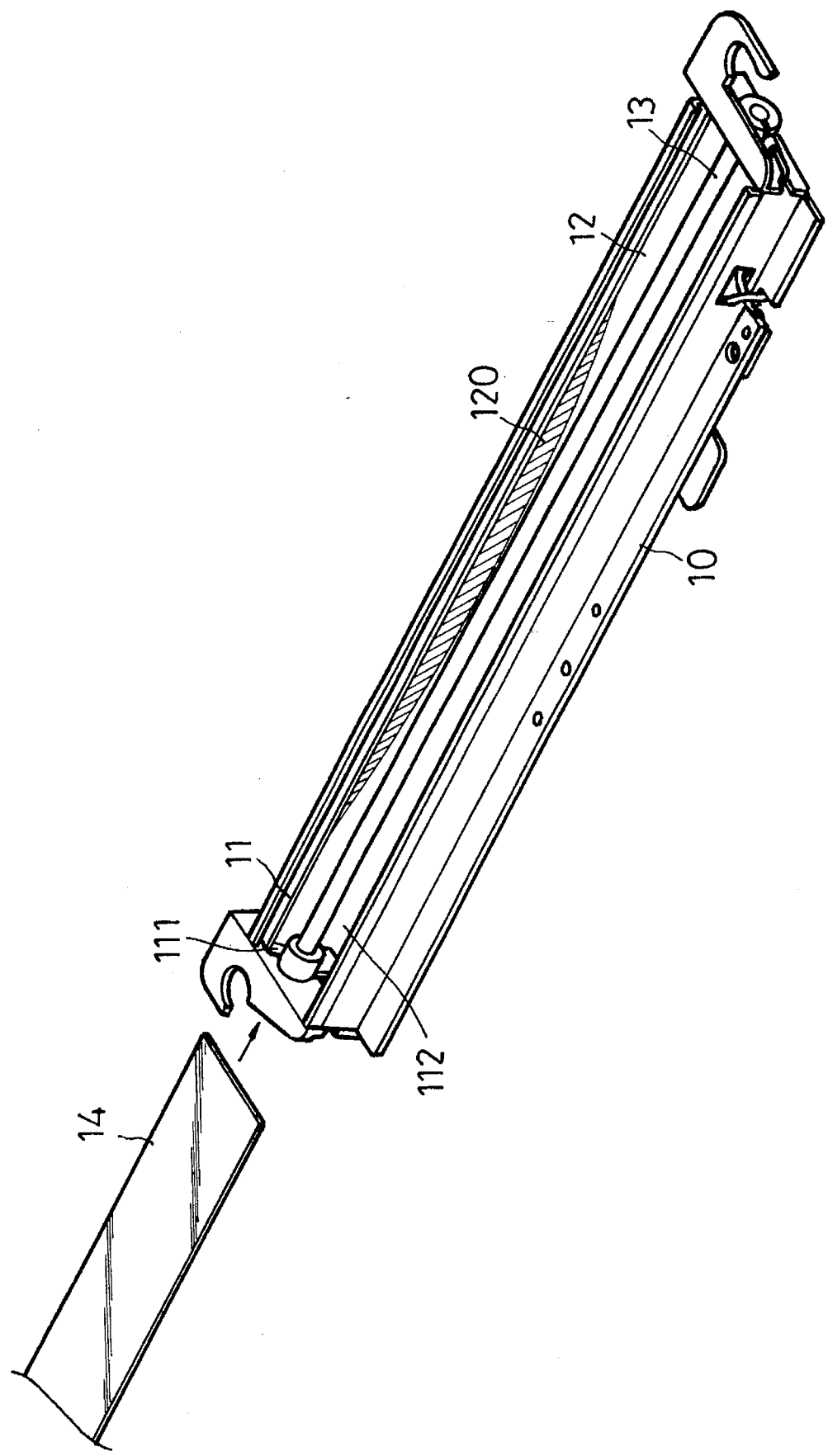
FIG. 1 is a perspective view of an embodiment of a lamp stand of the present invention.

Referring to FIG. 1, which shows a preferred embodiment of the present invention, a lamp stand (10) is formed in a generally rectangular body, a lamp shade (11) is formed with a asymmetrical curvature, a black reflector (120) having a curved surface is disposed on the inner surface of the lamp shade (12) and below a lamp tube (13), a dispersion plate (14) is disposed above lamp tube (13). Lamp shade (11) has a smaller curvature at the front lateral section (111) and has a greater curvature at the rear lateral section (112) such that, the brightness of lamp shade (11) would vary at different transversal positions. As shown in FIG. 1, the black reflector has a maximum width near the center of the scanning lamp tube and diminishing widths towards both ends of the scanning lamp tube so as to provide a gradually diminishing darkening effect from the center of said scanning lamp tube to both of its ends and thereby maintain evenly distributed brightness in the axial direction of the scanning lamp tube.

Figures 2, 3:
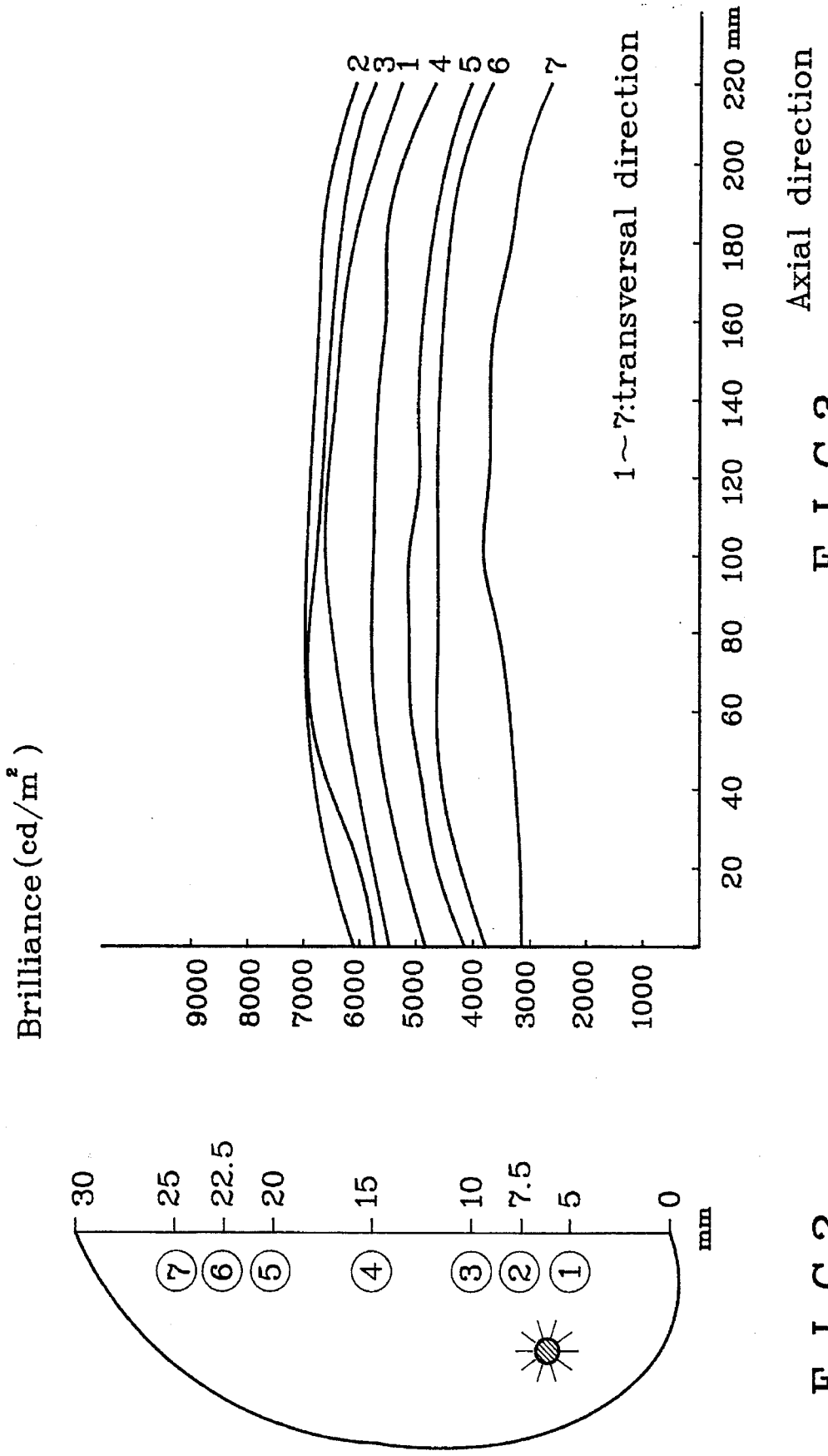
FIG. 2 is a schematic diagram illustrating the axial brilliance at a number of different positions in transversal direction of an embodiment of a lamp stand in the present invention.
FIG. 3 is another schematic diagram illustrating the axial brilliance at a number of different positions in transversal direction of an embodiment of a lamp stand in the present invention.

Now referring to FIGS. 2 and 3 for a corresponding brilliance of a lamp shade (11) at different transversal positions, horizontal axis illustrates the axial distance of a lamp shade (11), vertical axis illustrates the brilliance index at each corresponding position in transversal direction of lamp shade (11). The diagram was made by the measuring brilliance taken from seven different positions on the transversal line of a lamp shade crosssection starting from rear lateral section (112) to front lateral section (111) of lamp shade (11).

FIGS. 2 and 3 indicate two conclusions: firstly, the brilliance index line for a given transversal position is almost horizontal axially, showing that the black reflector with a curved surface does have the desired darkening effect; secondly, the brilliance index has a different value for a different transversal position, generally the average brilliance index decreased as the distance to the lamp tube increased. The second characteristics of such a lamp stand can be used for filtering purposes.

Referring to FIG. 4, when a scanning object is a transparency with strong contrast and requires a light source with greater brightness, a software setting process can be used to move CCD scanning head (15) in a transversal direction to a position X1 where a needed high brilliance of light source is readily available. By the same token, when low brilliance is required, CCD scanning head (15) can be moved transversally to a position X2 where the required low brilliance of light source is presented (also referring to FIG. 4).

Furthermore, during the scanning process, both lamp shade (11) and CCD scanning head (15), which are disposed respectively above and under a scanning transparency (16), can be moved synchronously in a transversal direction so that the desired brilliance of a light source can be obtained to achieve the desired scanning quality.

It is to be understood that the descriptions and preferred embodiments set forth above are only to serve for illustrative purpose, and do not intend to limit the scope of the present invention. Various changes and modifications may be made without departing from the scope of the present invention.

What is claimed is:

1. A brilliance control apparatus of light source in an optical scanner, particularly a brilliance control apparatus of light source in a transparency scanner, comprising a rectangular lamp stand, a scanning lamp tube having a center and two ends, and a lamp shade having a surface of asymmetrical curvature, said lamp shade having a black reflector of curved surface disposed thereon, said black reflector having a maximum width near the center of said scanning lamp tube and diminishing widths towards both ends of said scanning lamp tube so as to provide a gradually diminishing darkening effect from the center of said scanning lamp tube to both of its ends and maintain evenly distributed brightness in an axial direction of said scanning lamp tube.

2. A brilliance control apparatus of light source in an optical of claim 1 wherein said lamp shade has a front lateral section and a rear lateral section, and the front lateral section has a smaller curvature than that of the rear lateral section.

3. A brilliance control apparatus of light source in an optical of claim 1 which further comprises a dispersion plate covering said lamp shade.

* * * * *